United States Patent

[11] 3,622,898

[72] Inventor Isidore William Salmon
Los Angeles, Calif.

[21] Appl. No. 38,979

[22] Filed May 20, 1970

[45] Patented Nov. 23, 1971

[73] Assignee Contelesis Corporation
Maspeth, N.Y.

[54] CIRCUIT FOR PROCESSING HALL GENERATOR OUTPUT SIGNALS
3 Claims, 2 Drawing Figs.

[52] U.S. Cl. .......... 330/6, 324/45, 307/309, 330/1

[51] Int. Cl. .......... H03f 15/00

[50] Field of Search .......... 330/6; 307/309, 278; 324/117, 45

[56] References Cited

UNITED STATES PATENTS

| | | | |
|---|---|---|---|
| 3,195,043 | 7/1965 | Burig et al. | 324/45 |
| 3,525,041 | 8/1970 | Velsink | 324/117 |
| 3,551,706 | 12/1970 | Chapman | 307/309 |

*Primary Examiner*—Nathan Kaufman
*Attorney*—Smyth, Roston & Pavitt

ABSTRACT: A Hall device is capacitively connected across direct and inverting inputs of a differential-operational amplifier.

INVENTOR.
I. William Salmon

By Smyth, Roston & Pavitt
ATTORNEYS

CIRCUIT FOR PROCESSING HALL GENERATOR OUTPUT SIGNALS

The present invention relates to processing of output signals of Hall generators, to compensate offset and drift of gain in the output circuit as well as to compensate drift of the signal due to temperature variations.

A Hall generator is a device that develops an electrical voltage along a first axis (1) upon being biased with electric current along a second axis and (2) upon being traversed by a magnetic field along a third axis; the first, second and third axes being at right angles to each other. The output signal is the electric voltage along the first axis and is to represent the magnetic field. However, that signal may change, for example, due to temperature changes in the Hall device, changing its resistance which is effective twice, once as resistance within the output circuit, additionally the biasing conditions may vary due to this change.

In accordance with the present invention it is suggested to provide a high-gain differential amplifier and to connect a series circuit between the direct and the inverting inputs of the amplifier, the series circuit comprising the Hall effect device at its output signal electrodes, and at least one capacitor. The output of the differential amplifier is resistively coupled back to the inverting input thereof to obtain operational-type amplifier operation. As the resistance of the Hall device tracks the Hall constant, drift of gain is compensated by this circuit. The capacitive coupling of the Hall device to the amplifier eliminated DC offset and also low frequency, quasi-stationary signal drift. As a consequence, a rather stable device is established therewith.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figures 1, 2:
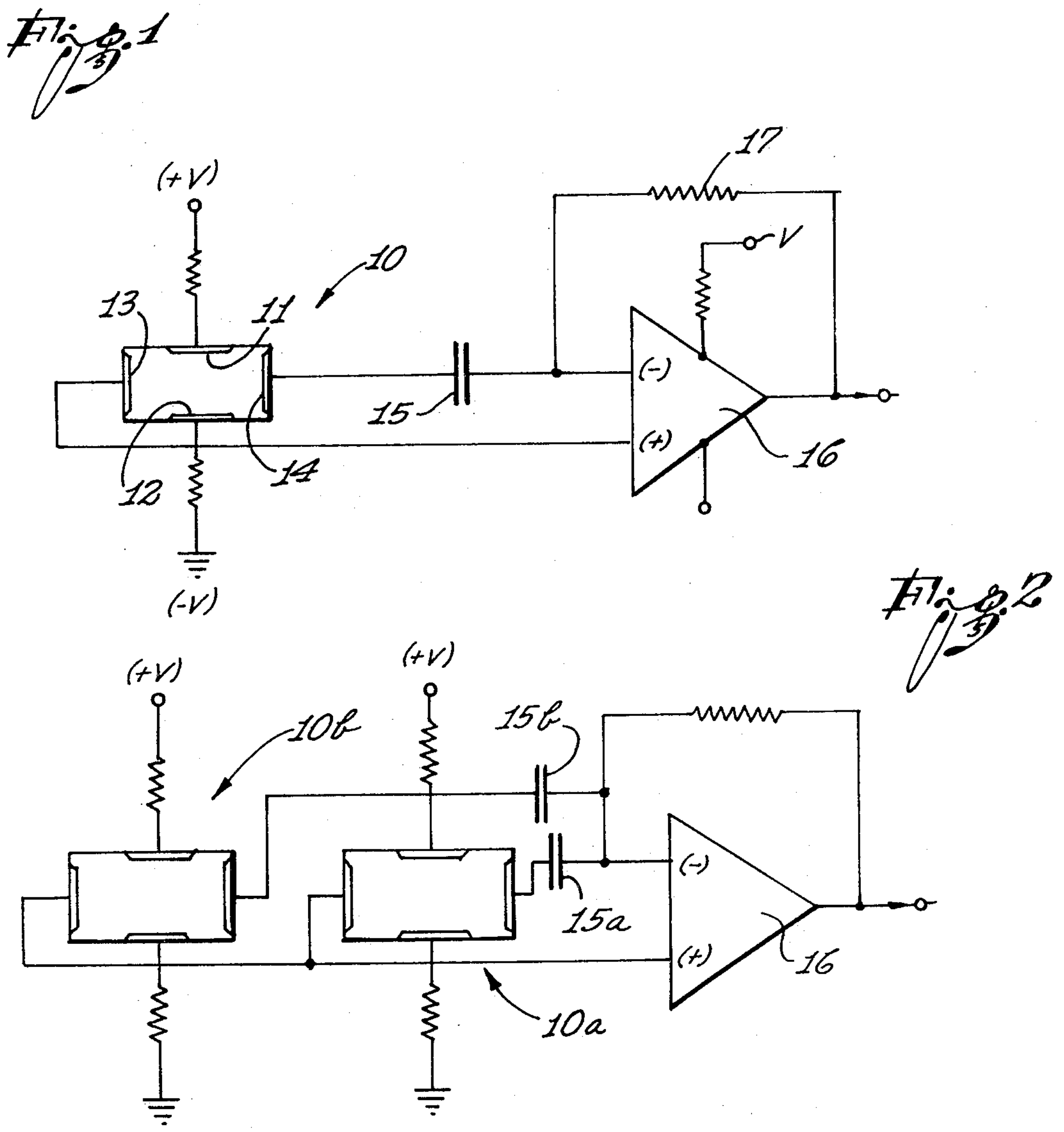
FIG. 1 illustrates a circuit diagram, partially as block diagram of the preferred embodiment of the present invention.
FIG. 2 illustrates a circuit incorporating an extension of the principle of the invention.

Proceeding now to the detailed description of the drawings, there is illustrated a Hall device 10 having biasing electrodes 11 and 12 which are connected between a voltage source V and ground; source V is a constant current source. A pair of resistors provides high-ohmic decoupling of the output electrodes of the Hall device from voltage source and ground. Due to this bias a particular biasing current flows across the Hall device, predominantly along an axis that is essentially defined by the shortest distance between electrodes 11 and 12 through the Hall-active material.

The Hall device is presumed to be the active element of a signal-transducing system, provided to monitor a magnetic field. Typically, that magnetic field is provided by a magnetic record carrier, and the Hall device is disposed to read the carrier during relative motion between the transducer and the carrier. Generally, a magnetic field traverses the Hall device, and the component of that field transverse to the device, i.e., at right angles to the first mentioned axis (along a second axis), causes a voltage drop across the Hall device, transverse to both, the first and second axis. The magnetic field is presumed to act normal to the plane of the drawing. The voltage is picked up by a pair of electrodes 13 and 14 arranged to obtain maxima output, i.e., their distance is along a third axis that is at right angles to the first and second axes as defined.

The Hall device, particularly the resistance as defined therein between electrodes 13 and 14, is connected in series with a capacitor 15, and this series circuit is connected between the inverting input (−) and the direct input (+) of a high-gain differential amplifier 16. A resistor 17 couples the output of the amplifier to the inverting input (−) thereof to obtain particular feedback for establishing a particular gain.

As the gain of the amplifier is determined by the ratio of the resistance of the Hall device and of the feedback resistor 17, drift of gain of the amplifier is compensated because the resistance of the Hall device tracks the temperature variable Hall constant, (which provides the relation between pickup voltage and magnetic field). Therefore, the relationship between magnetic field and amplifier output remains constant in spite of the gain drift.

The capacitive coupling of the Hall device to the two inputs of the operational amplifier eliminates DC offset of the amplifier and also compensates drift of the Hall signal voltage, developed as an e.m.f. between the electrodes 13 and 14. Drift of signal can be regarded as equivalent of very low frequency noise, i.e., it is quasi-stationary signal that appears as modulation of the information signal proper. The capacitor 15 is now selected to have a high impedance for that drift signal. In particular, the impedance should be significantly larger, for a few c.p.s., than the ohmic resistance of the Hall device. On the other hand, the capacitor is not to have significant impedance for information signal frequencies. As Hall devices are used for monitoring low signal frequencies, for example, 100 Hz. or lower, the capacitor 15 should be as large as reasonably possible; its impedance at signal frequency should be lower, preferably significantly lower than the resistance of the Hall device.

Thus, mere presence of the capacitor eliminates DC offset, its dimensioning avoid signal drift. As a consequence, the output signal of the amplifier 16 is, and remains, the desired electrical signal representation of the magnetic field to be measured and sensed, even if the temperature of the Hall device varies.

FIG. 2 illustrates the extension of the aforedescribed principle for processing the output voltage of a Hall generator, to obtain balancing of the outputs of several Hall devices. There are shown two Hall devices 10*a* and 10*b* sensing the same magnetic field. Separate capacitors 15*a* and 15*b* couple the two Hall devices in parallel across the two inputs of the amplifier 16. The two Hall devices are biased separately whereby high ohmic resistance in the two biasing circuits effectively decouples the two Hall devices. The resulting output of the amplifier is the average of the two inputs. This is of significance; for example, in case the source of the magnetic field such as a record carrier varies its distance from the Hall devices but in opposite directions so that the field strength as picked up by one device increases, while the field strength as picked up by the other device decreases. The circuit effectively averages their outputs.

The invention is not limited to the embodiments described above but all changes and modifications thereof not constituting departures from the spirit and scope of the invention are intended to be included.

I claim:

1. A circuit for processing the output signal of a Hall generator, having a pair of pickup electrodes, comprising:

capacitor means including at least one capacitor connected in series with the pair of electrodes;

a high-gain, differential amplifier having inverting and direct input terminal and an output terminal, the series circuit of the capacitor means and of the pair of electrodes of the Hall device connected between the two input terminals; and resistive means connected for providing feedback between the output and the inverting input of the differential amplifier to determine amplifier gain, the connection to the input terminals of the amplifier compensating amplifier offset, signal drift and drift of amplifier gain.

2. A circuit as in claim 1, the capacitor means including a capacitor connected between the Hall generator and the inverting input of the amplifier, the capacitor having impedance lower than the resistance of the Hall generator for magnetic signal frequencies having information significance.

3. A circuit as in claim 1, comprising a second Hall generator having output electrodes connected in series to a second capacitor means, and connected therewith across the two input terminals of the amplifier, the first and second Hall generator for placement into the same flux path.